(12) United States Patent
Mouws

(10) Patent No.: US 6,203,055 B1
(45) Date of Patent: Mar. 20, 2001

(54) SAFETY DEVICE FOR AN AIRBAG-SYSTEM

(75) Inventor: Raymond J. A. Mouws, Huybergen (NL)

(73) Assignee: Martimon B.V., Huybergen (NL)

( * ) Notice: Subject to any disclaimer, the term of this patent is extended or adjusted under 35 U.S.C. 154(b) by 0 days.

(21) Appl. No.: 09/051,386

(22) PCT Filed: Oct. 10, 1996

(86) PCT No.: PCT/NL96/00395

§ 371 Date: Sep. 18, 1998

§ 102(e) Date: Sep. 18, 1998

(87) PCT Pub. No.: WO97/13659

PCT Pub. Date: Apr. 17, 1997

(30) Foreign Application Priority Data

Oct. 11, 1995 (NL) .................................................... 1001394

(51) Int. Cl.[7] ................................................ B60R 21/05
(52) U.S. Cl. .......................................... 280/727; 280/750
(58) Field of Search ................................... 280/727, 731, 280/750, 743.2, 743.1; 74/558, 558.5, 552

(56) References Cited

U.S. PATENT DOCUMENTS

| D. 412,690 | * | 8/1999 | Capello | ................. | D12/177 |
|---|---|---|---|---|---|
| 1,997,738 | * | 4/1935 | Maxedon et al. | ................. | 74/558.5 |
| 3,437,350 | * | 4/1969 | Clark | ................. | 280/750 |
| 3,982,602 | * | 9/1976 | Gorman | ................. | 180/114 |
| 5,131,290 | * | 7/1992 | Atkinson | ................. | 74/558.5 |
| 5,157,986 | * | 10/1992 | Keller | ................. | 74/558.5 |
| 5,277,440 | | 1/1994 | Jackson, Jr. | | . |
| 5,613,383 | * | 3/1997 | Banez | ................. | 70/209 |
| 5,775,722 | * | 7/1998 | Moore et al. | ................. | 280/727 |
| 5,997,028 | * | 12/1999 | Lenz | ................. | 280/727 |

FOREIGN PATENT DOCUMENTS

| 29508472 U | 9/1995 | (DE) . |
|---|---|---|
| 29518540 U | 1/1996 | (DE) . |

* cited by examiner

*Primary Examiner*—J. J. Swann
*Assistant Examiner*—David R. Dunn
(74) *Attorney, Agent, or Firm*—Jeffrey D. Myers

(57) ABSTRACT

A safety device for an airbag-system which has not been triggered by an accident, comprising a fabric which is suitable for surrounding a steering wheel of a motorcar which is provided with the airbag-system. The fabric is suitable for tightening at the side of the steering column on which the steering wheel is mounted, such that if the airbag-system is activated during a rescue operation, inflation of the airbag is hindered by the fabric.

8 Claims, 2 Drawing Sheets

SAFETY DEVICE FOR AN AIRBAG-SYSTEM

The present invention relates to a safety device for an airbag-system.

It is known from the Dutch newspaper *De Volkskrant* of Oct. 3, 1995, that a good 25 years ago already an airbag was designed which would instantly pop out from the middle of the steering wheel of a motorcar the moment sensors in the motorcar perceive a collision. Such airbags prevent serious injuries to occupants of the motorcar, especially if they were not wearing a safety belt at the time of the collision. Actually, airbags are still subject to constant development, taking better into account the kind of collision and the situation in which the occupants of the motorcar find themselves at the moment of the collision and inflation of the airbag.

Practical experience has shown, however, that after an accident or collision one may face the problem that the airbag is not yet activated and assistance to the occupants takes place while the risk exists that the airbag will still inflate. This is a danger for both the helpers and occupants needing assistance.

To avoid this problem, an airbag retention device has been proposed in U.S. Pat. No. 5,277,440. From this document, it is known to apply a generally round sheet of flexible material having a diameter slightly larger than the steering wheel or at least approximately the same size as the steering wheel. The device also comprises a plurality of criss-crossed strips, preferably of a reinforced nylon material, each attached to one another at a central point. Each of the strips terminates in a closed loop and a cord or drawstring passes through each of the closed loops of each of the strips. In such a device, the pressure build-up during inflation of the airbag is enormous and no guarantee exists that the cord or drawstring will be able to withstand the pressure build-up.

It is therefore preferred in the known safety device to have the drawstrings pass through each loop twice, i.e. twice around the periphery of the strips to provide additional restraining strength. When the safety device is placed over the steering wheel, the drawstring or cord may be pulled tightly to pull the end loops of each of the strips towards to each other so as to form an opening having a smaller diameter than the diameter of the steering wheel, and in order to provide a tight fit of the restraining fabric around the steering wheel. However, when the drawstring is tightened, the opening is only slightly smaller than the diameter of the steering wheel.

This aspect in combination with the huge pressure build-up during inflation of the airbag renders this system unreliable when repeatedly used or even when used only once in retaining an inflating airbag.

It is the object of the invention therefore to provide a reliable safety device for an airbag-system which can be safely used on any size steering wheel and repeatedly.

To this end, the safety device according to the invention is characterized in that a space of 10 to 15 cm is left between the steering wheel and the fabric fitted around it. Contrary to any teaching in the prior art, every tight fit of the fabric is therewith avoided, and in the case of untimely inflation this leaves the airbag sufficient space for a controlled pressure build-up.

The fabric can be secured particularly effectively around the steering wheel if the cord or the ribbon for gathering the outer edge is connected at a first extremity with the outer edge of the fabric and is provided at a second extremity with a hook means for the detachable connection of the second extremity to a permanent point. The chosen hook means may, for instance, be a securable carabine hook such as the clog screwgate kind, which has a tensile strength of about 2400 kg.

In a first embodiment of the safety device according to the invention at least part of the fabric takes the form of a meshed net. The dimensions of the net may vary. However about 9×9 cm has been shown to be a preferred mesh size. This provides the airbag with enough space to allow it to still extend somewhat through the mesh of the net, so that tensions of too great a force in the cords of the net are avoided.

The net can be made sufficiently strong by using aramide cords having a diameter of about 7 to 8 mm. Of course, other cords providing sufficient tensile strength are also possible, but especially the use of aramide provides a lightweight, yet strong product which is quite suited for the intended safety function. Moreover, this function is maintained over an extensive temperature range.

In another embodiment of the safety device according to the invention at least part of the fabric is closely woven and is provided with one or more openings near the outer edge. In general, using a closely woven fabric affords the advantage of halving the sound pressure produced by an activated airbag. The sound pressure of an exploding airbag ranges from 120–150 dB. In addition, very adequate protection is provided against dust production caused by the exploding airbag, which would otherwise cause irritation of the eyes. One may choose, for instance, to make the fabric from the fire-resistant Nomex III® material made by Ten Cate Protect B.V., Nijverdal, or from metal. Further, when using a fabric, it is desirable to reinforce the openings which serve to limit the pressure build-up when the airbag is activated, by means of, preferably metal rings. A very favourable embodiment is characterized in that at least part of the fabric is formed from closely woven aramide fibres such as, for instance, Kevlar®. Apart from the above-mentioned advantages for using aramide there is the further advantage that the fabric—though closely woven—is gas-permeable, affording better control of the pressure build-up from the airbag.

The invention will now be further elucidated with reference to the drawing in which FIG. 1 shows a first embodiment of the safety device according to the invention in the spread out state;

Corresponding parts are indicated by the same reference numbers.

Figure 1:
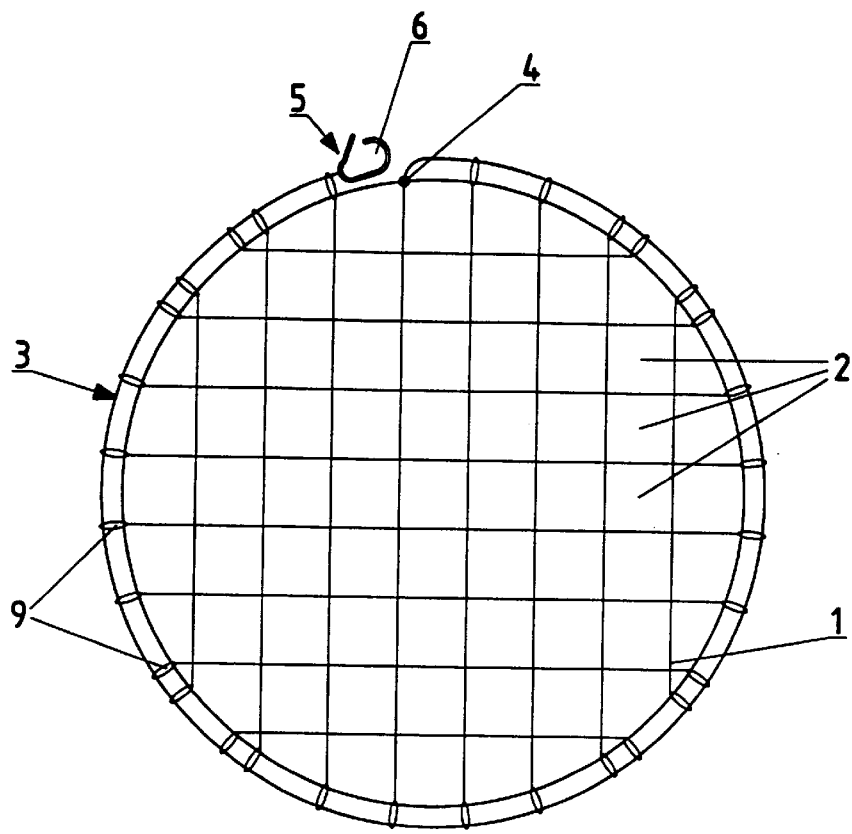

FIG. 1 shows a safety device according to the invention comprising a net 1 provided with mesh 2. The shape of the net 1 is round and its outer edge is provided with a cord 3 which preferably is attached at one extremity 4 to the net 1, and is provided at the other extremity 5 with a hook means 6 for the detachable connection of this second extremity 5 to a permanent point.

Figures 2, 3:
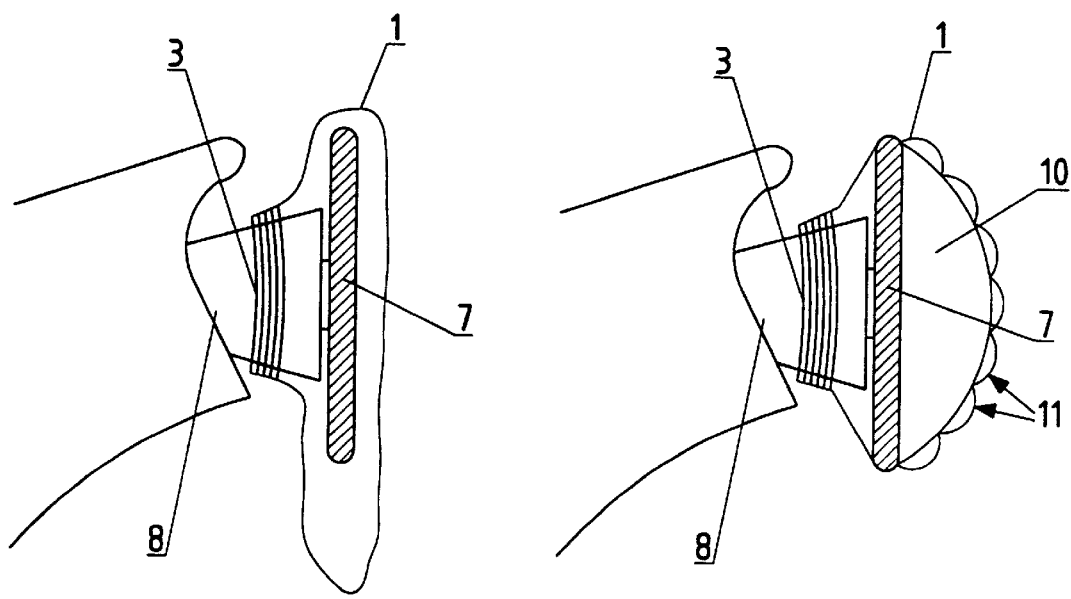
FIG. 2 shows the safety device in the first embodiment according to the invention fitted around a steering wheel of a motorcar before inflation of the airbag.
FIG. 3 shows the safety device in the first embodiment according to the invention fitted around a steering wheel of a motor car after inflation of the airbag.

As shown in FIG. 2, the net 1 is fitted over the steering wheel 7 and tightened at the side of the steering column 8 by drawing tight the cord 3 which, in order to secure the net 1 around the steering wheel 7, may be wrapped several times around the steering column 8 and be fastened by means of the hook 6 into one of the loops 9 or a mesh 2 of the net 1.

FIG. 3 shows the situation where the airbag 10 has been activated and the net 1 envelopes the airbag 10, while the airbag 10 can be seen to form bulges 11 through the mesh 2 of the net 1. In this situation, the space between the net 1 and the steering wheel 7 is maximally 10 to 15 cm. Making the net 1 from aramide cords having a diameter of about 7 to 8 mm, provides a reliable safety device which can also be used under fire-hazardous conditions due to the fact that aramide retains its tensile strength over a wide temperature range. The hook means 6 is preferably a securable carabine hook of the clog screwgate kind, which has a tensile strength of about 2400 kg.

Figure 4:
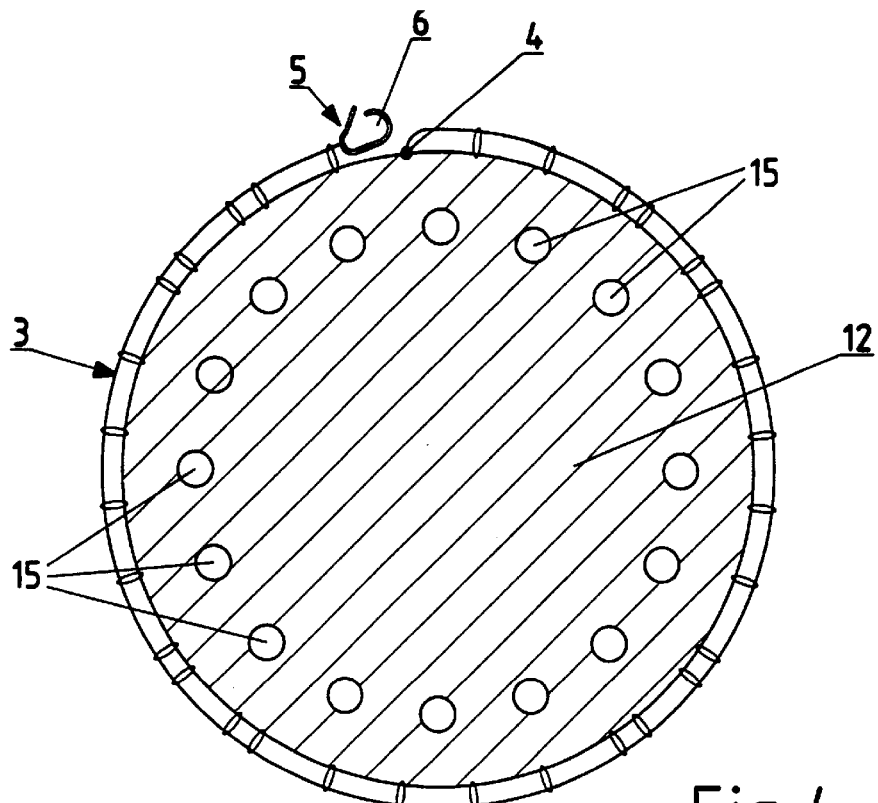
FIG. 4 shows the safety device in a second embodiment according to the invention in the spread out state.

FIG. 4 shows a second embodiment of the safety device according to the invention, in which the fabric in its totality is closely woven and is provided with openings 15 near the outer edge. This closely woven fabric can thus be fitted over the steering wheel like a sack. The fabric may be made from fire-resistant Nomex III® material or possibly from metal. With Nomex III® or other fabric the openings 15 are preferably to be provided with metal rings for reenforcement. By employing openings 15, the pressure build-up on activation of the airbag is controlled and does not reach such high values as when such openings are not employed. The closely woven fabric 12 may also be made from aramide fibres, for instance from Kevlar®. This has the advantage that the openings 15, though useful, are less crucial, because such an aramide fabric is gas-permeable.

Figure 5:
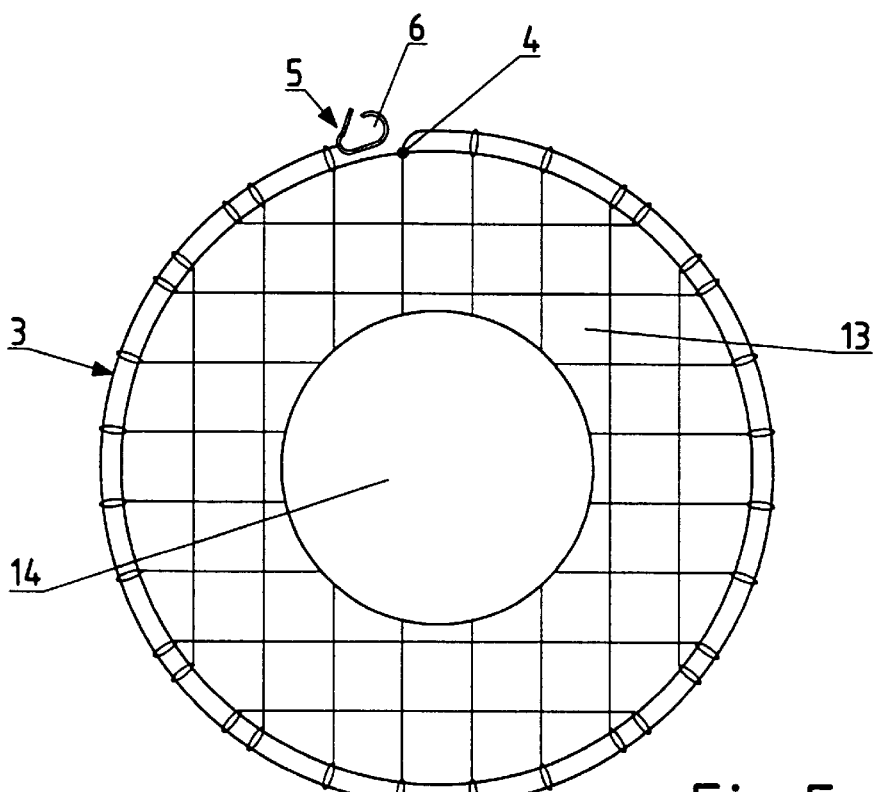
FIG. 5 shows the safety device in a third embodiment according to the invention in the spread out state.

FIG. 5 shows a third embodiment of the safety device according to the invention, namely a combination of the embodiments shown in FIG. 1 and FIG. 4. In this embodiment part 14, which will be positioned over the steering wheel, is executed as closely woven fabric in order to retain the best possible protection against dust for the benefit of both the occupants of the motorcar and the helpers, which protection is optimal in the embodiment according to FIG. 4. The part 13 surrounding the closely woven part 14 of the fabric takes the shape of a net as shown in the embodiment of FIG. 1. Thus, in addition to the good protection against dust, this embodiment offers very adequate control of the pressure build-up.

What is claimed is:

1. A safety device for an airbag-system, characterized in that the safety device comprises a flexible fabric surrounding a steering wheel of a motorcar provided with the airbag-system, and suitable to be tightened at the side of a steering column on which the steering wheel is mounted, such that when the airbag-system is activated, inflation of the air-bag is hindered by the fabric, wherein an outer edge of the fabric comprises a structure selected from the group consisting of cords and ribbons for narrowing the outer edge of the fabric, characterized in that a space of 10 to 15 cm is left between the steering wheel and the fabric such that the safety device hinders expansion of the airbag, while the space provides limited expansion to prevent an explosion of the airbag.

2. A safety device according to claim 1, characterized in that a first extremity of the structure is connected with the outer edge of the fabric and in that said safety device additionally comprises a hook means for detachable connection of a second extremity of the structure to a permanent point.

3. A safety device according to claim 1 characterized in that at least part of the fabric comprises a meshed net.

4. A safety device according to claim 3, characterized in that the meshed net is approximately 9×9 cm in size.

5. A safety device according to claim 3 characterized in that the meshed net comprises aramide cords having a diameter of about 7–8 mm.

6. A safety device according to claim 1 characterized in that at least part of the fabric is closely woven and near the outer edge comprises one or more openings.

7. A safety device according to claim 6, charactered in that the openings are reinforced by metal rings.

8. A safety device according to claim 1 characterized in that at least part of the fabric comprises closely woven aramide fibres.

* * * * *